(12) United States Patent
Cortis et al.

(10) Patent No.: US 10,229,188 B2
(45) Date of Patent: Mar. 12, 2019

(54) AUTOMATIC CORPUS EXPANSION USING QUESTION ANSWERING TECHNIQUES

(71) Applicant: International Business Machines Corporation, Armonk, NY (US)

(72) Inventors: Keith Cortis, Rabat (MT); Urvesh Bhowan, Bray (IE); Daniel John McCloskey, Dublin (IE); Seamus Ronan McAteer, Navan (IE)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 14/959,541

(22) Filed: Dec. 4, 2015

(65) Prior Publication Data

US 2017/0161363 A1    Jun. 8, 2017

(51) Int. Cl.
*G06F 17/30*    (2006.01)

(52) U.S. Cl.
CPC .............. *G06F 17/30675* (2013.01)

(58) Field of Classification Search
None
See application file for complete search history.

(56) References Cited

U.S. PATENT DOCUMENTS

| | | | |
|---|---|---|---|
| 7,805,288 B2 | 9/2010 | Guo | |
| 8,738,362 B2 | 5/2014 | Ferrucci et al. | |
| 8,892,550 B2 | 11/2014 | Chu-Carroll et al. | |
| 8,918,431 B2 | 12/2014 | Mark et al. | |
| 2009/0287678 A1 | 11/2009 | Brown et al. | |
| 2011/0066587 A1 | 3/2011 | Ferrucci et al. | |
| 2011/0125734 A1* | 5/2011 | Duboue | G09B 7/00 707/723 |
| 2012/0077178 A1* | 3/2012 | Bagchi | G09B 7/00 434/362 |
| 2012/0078895 A1 | 3/2012 | Chu-Carroll et al. | |
| 2013/0007055 A1 | 1/2013 | Brown et al. | |
| 2013/0017523 A1 | 1/2013 | Barborak et al. | |
| 2013/0018652 A1 | 1/2013 | Ferrucci et al. | |
| 2013/0066886 A1 | 3/2013 | Bagchi et al. | |
| 2014/0365502 A1 | 12/2014 | Haggar et al. | |
| 2015/0006460 A1 | 1/2015 | Skiba et al. | |

OTHER PUBLICATIONS

"Financial Services Standards", Object Management Group, http://www.omg.org/hot-topics/finance.htm, retrieved from the internet Dec. 3, 2015, 2 pages.

(Continued)

*Primary Examiner* — Tuankhanh D Phan
(74) *Attorney, Agent, or Firm* — Francis Lammes; Stephen J. Walder, Jr.; William J. Stock

(57) ABSTRACT

Expanding the corpus of a question answering system. The question answering system is adapted to generate a candidate answer to a query. The candidate answer may be incorporated into the corpus of the question answering system if the candidate answer meets or exceeds a predetermined requirement. By expanding the corpus with material that has been determined to be useful for answering a query, for example, the corpus may be expanded automatically in an accurate and efficient manner.

18 Claims, 5 Drawing Sheets

(56) References Cited

OTHER PUBLICATIONS

Bechet, Nicolas et al., "Corpus and Web: Two Allies in Building and Automatically Expanding Conceptual Classes", Slovene Society Informatika, Ljubljana, Informatica, vol. 34, No. 3, Mar. 30, 2010, pp. 279-286.

Diaz, Fernando et al., "Improving the Estimation of Relevance Models Using Large External Corpora", ACM, http://www.dtic.mil/cgi-bin/GetTRDoc?AD=ADA449013, SIGIR'06, Seattle, WA, Aug. 6-11, 2006, 9 pages.

Ferrucci, David et al., "Building Watson: An Overview of the DeepQA Project", Association for the Advancement of Artificial Intelligence, http://www.aaai.org/ojs/index.php/aimagazine/article/download/2303/2165, Fall 2010, pp. 59-79.

High, Rob, "The Era of Cognitive Systems: An Inside Look at IBM Watson and How it Works", IBM Corporation, Redbooks, Dec. 12, 2012, 16 pages.

Mac An Tsaoir, Ronan, "Using Spreading Activation to Evaluate and Improve Ontologies", ACL, http://www.aclweb.org/anthology/C/C14/C14-1211.pdf, Proceedings of COLING 2014, the 25th International Conference on Computational Linguistics: Technical Papers, Dublin, Ireland, Aug. 23-29, 2014, pp. 2237-2248.

McCord, M.C. et al., "Deep parsing in Watson", IBM J. Res. & Dev. vol. 56 No. 3/4 Paper 3, May/Jul. 2012, pp. 3:1-3:15.

Qiu, Xipeng et al., "Automatic Corpus Expansion for Chinese Word Segmentation by Exploiting the Redundancy of Web Information", ACL, http://aclweb.org/anthology/C/C14/C14-1109.pdf, Proceedings of COLING 2014, the 25th International Conference on Computational Linguistics: Technical Papers, Dublin, Ireland, Aug. 23-29, 2014, pp. 1154-1164.

Schlaefer, Nico, "Statistical Source Expansion for Question Answering", Carnegie Mellon University, School of Computer Science, Language Technologies Institute, Doctoral Dissertation, CMU-LTI-11-019, Jan. 2011, 171 pages.

Yuan, Michael J., "Watson and healthcare", IBM Corporation, developerWorks, http://www.ibm.com/developerworks/industry/library/ind-watson/, Apr. 12, 2011, pp. 1-14.

\* cited by examiner

AUTOMATIC CORPUS EXPANSION USING QUESTION ANSWERING TECHNIQUES

BACKGROUND

The present invention relates to the field of information retrieval systems, and more particularly to Question Answering (QA) systems which retrieve or construct answers to queries using a corpus of documents or information.

It is fairly typical for queries (e.g. questions) to be posed in natural language, and so complex Natural Language Processing (NLP) techniques can be needed in order to correctly handle such queries. QA systems may therefore operate on an underlying natural language corpus (such as Wikipedia™) wherein content must first be ingested, processed, and analyzed by the system (e.g. using NLP techniques) in order to answer questions. Such QA systems can exhibit poor/low accuracy when the required information is missing from the underlying data source.

In the context of enterprise systems, this problem can be more pronounced, because the underlying corpus of documents or information is normally limited to the organization's immediate business area or internal processes (e.g. a specific domain) where documents are authored by a small number of experts. The following problems are therefore commonplace for domain-specific QA systems, especially when queries are composed from natural language:

Natural language expression from a large number of human users is far more varied than what can be described with the limited corpus of a domain-specific QA system;

Questions relating to background information on common concepts may not be answered correctly, as such data is often omitted from the corpus of a domain-specific QA system by subject-matter experts;

Questions about related information that does not exist in the corpus will either be answered in an incorrectly, incomplete, unhelpful or misleading manner, which could even cause a loss of revenue for example.

To address such problems, various approaches have been proposed. One such approach relies on recognizing queries that are not related to the immediate context of the enterprise corpus and then handling the queries in a special manner. However, this is highly difficult when queries appear to be related to the context of the corpus but the corpus content is insufficient to generate a correct answer. Another approach that has been proposed is to manually expand the corpus of the system with extra hand-written data. Although this can provide a good solution in some cases, it is very expensive and requires significant investment from domain experts.

Yet another proposed approach comprises automatically expanding a corpus with general data from known open-domain data sources, such as Wikipedia™, Lexis Nexis™, DBPedia™, Streaming sources, etc. This can add large quantities of unrelated data unless it is done in a strategic manner. However, strategically expanding a corpus with high-quality related data from known sources is typically a time-consuming manual process, and therefore expensive. Additionally, the quality of the data is not as good as content authored by domain experts. Without an automatic method of assessing semantic relatedness, human error can also be a problem when expanding a corpus. For example, documents that look like appropriate expansion candidates, to a domain expert, may not help with the generation of answers that are not currently covered by a corpus.

Further issues have been identified in relation to improving the corpus of a domain-specific QA system. For example, selecting the most relevant and helpful external content to compliment a domain-specific (e.g. enterprise) corpus content is a non-trivial task, because, for example, most open-domain corpora typically contain millions of documents, and many significantly varied domains. Also, even for external domain-specific corpora, identifying related documents that are not currently covered by a domain-specific corpus is a significant challenge.

Expanding the system with too much unrelated data can also have a negative effect. The larger the total corpus ingested by a QA system, the greater the system complexity in the generation and ranking of answers, leading to a general reduction in accuracy and an increased demand for required computational resources (e.g. memory, disk storage, CPU usage, etc.), in order to process user queries in real-time.

Accordingly, there exists a problem of how to improve upon the abovementioned processes, and a solution that does this accurately and efficiently, and even automatically, would be of significant value.

SUMMARY

According to an embodiment of the present invention there is provided a computer-implemented method of expanding the corpus of a question answering, QA, system comprising: identifying a portion of the corpus to be expanded; generating one or more search queries based on at least one of: the semantics or linguistic features of the identified portion of the corpus; and a semantic resource; generating a candidate answer to the one or more queries using the QA system; determining a rating for the candidate answer using one or more scoring algorithms; and integrating the candidate answer with the portion of the corpus if the determined rating for the candidate answer meets or exceeds a predetermined requirement.

Proposed is a concept of expanding the capabilities of a QA system by leveraging the QA system to evaluate and accept (e.g. integrate or incorporate) new related content into its underlying corpus of documents or information. In particular, it is proposed to generate a candidate answer to a query using a QA system, and then incorporate the candidate answer into the corpus if the answer meets or exceeds a predetermined requirement. By expanding the corpus of a QA system with material that has been determined by the QA system to be required for answering a query, for example, the corpus may be expanded automatically in an accurate and efficient manner.

It is also noted that, by leveraging abstract semantic representation, such as a graph derived from a semantic web ontology, embodiments may be inherently language independent, and thus may not depend on language specific features (such as for Mandarin for example).

Embodiments may therefore enable a user to interact with a domain-specific QA system using natural language and/or terms that may have otherwise been inappropriate for use with a conventional domain-specific QA system. Embodiments may also enable questions relating to background information on common concepts to be answered correctly by an enterprise QA system that was originally/initially set-up with a domain-specific corpus by subject-matter experts (e.g. experts in the specific enterprise domain).

By employing a semantic resource, embodiments may be able to identify portions of the underlying corpus that require expansion. Unnecessary expansion of the corpus may therefore be avoided which, in turn, may help to reduce QA system complexity. Also, Domain-related Semantic Resources (DSRs) may be derived from existing resources like question-answer pairs (e.g. ground-truth data), or statistical analysis of parse frames in the Domain Specific Corpus (DSC) of a QA system, thereby facilitating semantically relevant graph-based methods for search and scoring of additional content.

By taking account of semantic relevance of queries, and even the capabilities of a QA pipeline, an expanded corpus provided by an embodiment may be much more relevant than one generated using simple approaches (which may rely on keyword overlap techniques for example).

Furthermore, many different ways to derive and leverage suitable semantic resources may be employed by embodiments. Accordingly, the resource overhead(s) of embodiments may be relatively low.

Embodiments may even cater for situations where there is no available DSC. For instance, an embodiment may employ the presence of a DSR to enable the building/generation of new DSC from scratch.

The step of identifying a portion of the corpus to be expanded may comprise: determining a representation quality of a portion of the corpus; and identifying the portion of the corpus as a portion of the corpus to be expanded if the determined representation quality of the portion does not meet a predetermined quality requirement. For example, DSRs may be used to identify low-detail portions of the DSC of a QA system, thus suggesting that additional content would be beneficial. The QA architecture may use these portions of the corpus as input queries in order to search for and rank corpus expansion candidates.

The step of determining a representation quality of a portion of the corpus may comprise at least one of: identifying the low frequency occurrence of semantic concepts or relationship patterns in the portion of the corpus; using a statistical language model to determine if one or more concepts of the portion of the corpus are defined with a predetermined level of clarity; and identifying the presence of answers to predetermined problematic questions within the portion of corpus. Embodiments may therefore be adapted to use one or more techniques for identifying portions of the corpus that have poor representation and/or would most benefit from corpus expansion. Unnecessary expansion of the corpus may thus be avoided, thereby minimizing resource requirements and helping to reduce system complexity.

In an embodiment, the step of generating one or more search queries may comprise generating one or more search or natural language queries, and wherein generating one or more search or natural language queries comprises at least one of: generating a natural language query based on a question or an answer to a question associated with the identified portion of the corpus; using linguistic features derived from the corpus or semantic resource, to construct a search or natural language query; traversing a semantic graph associated with the corpus or semantic resource to construct a search or natural language query; generating a search or natural language query based on a predetermined problematic question associated with the QA system; and generating a search or natural language query based on a portion of a document provided by the corpus or semantic resource. Queries may therefore be constructed in both natural language form or search engine form. For example, queries may be constructed from question-answer pairs from the corpus (which represent the corpus ground-truth), and not from questions alone. By way of further example, queries may be generated from linguistic features discovered or derived from the corpus or a domain-specific semantic resource, such as named entities or semantic concepts, topic classifications, parse structures, lexical frames, part of speech patterns, and inter-concept relationships for example. Furthermore, it is noted that, by leveraging graph-based techniques for adaptation in NLP, embodiments may leverage existing off-the-shelf ontologies and tailor them to the specifics of a given enterprise domain. This has been shown to produce high accuracy in complex NLP tasks (such as semantic query expansion and word-sense disambiguation).

The step of generating a candidate answer to the one or more queries may comprise: controlling the QA system to analyze the one or more queries, to formulate one or more search queries against different knowledge sources, and to identify and retrieve relevant content from the knowledge sources based on the analysis result; and generating the candidate answer based on the identified relevant content, wherein candidate answers are representative of content from the knowledge sources. By way of example, candidate answers may be in the form of document sections, paragraphs, passages or entire document content. Candidate answers may therefore provide appropriate or relevant material for answering a query, and the material may be provided in a form which is appropriate for use by a person and/or inclusion in a corpus.

In some embodiments, the step of determining a rating for the candidate answer may comprise: scoring the candidate answer in accordance with one or more QA scoring algorithms, the one or more QA scoring algorithms being adapted to determine a rating for the candidate answer based on: the natural language query; the corpus; and a semantic resource; and rating the similarities and degree of matching between one or more of: search query; the generated candidate answer; one or more previously generated candidate answers; the corpus; and at least one domain-specific semantic resource. The full range of analysis and scoring techniques available in a QA system are not normally exposed for corpus expansion, mainly due to complexity of integration for separate tasks. However, by leveraging the existing QA infrastructure, with minimal adaptation, proposed embodiments may overcome this limitation. Making use of many different techniques that work in tandem may greatly improve robustness and accuracy.

The step of integrating the candidate answer with the portion of the corpus may comprise: comparing the determined rating for the candidate answer against a threshold; and based on the result of the comparison, determining if the rating for the candidate answer meets or exceeds the predetermined requirement. For example, QA outputs may be ranked by default, and the top N candidates may be automatically integrated, or provided to a SME for manual evaluation, wherein N may be determined according to a threshold that is representative of an acceptable information quality.

Some embodiments may further comprise the step of: generating a semantic resource from at least one domain-specific semantic resource. Embodiments may therefore be able to generate its resources from various semantic resources that are tailored to specific information domains or topics. For example, information from difference domain-specific semantic resources may be selected according to determined requirements and complied into a custom-built semantic resource that includes only relevant information. This may help to reduce the size of the semantic resource and thus avoid unnecessary data processing and/or expansion of the corpus. Further the step of generating a semantic resource may comprise: processing data of the domain-specific semantic resource to generate a semantic graph; and weighting the semantic graph based on characteristics of the corpus. Graph-based techniques may therefore be used, thereby enabling existing off-the-shelf ontologies to be implemented and/or tailored for the specifics of a given enterprise domain.

In some embodiments, the step of generating a semantic resource may comprise processing data from question-answer pairs from ground-truth or answer-key describing domain terminology and natural language equivalence, word embeddings, statistical analysis of logical triples or parse frames, semantic concept and relationship patterns, concept density and frequency, and/or existing off-the-shelf ontologies from general super-domains. Alternatively, and/or additionally, the step of generating a semantic resource may comprise processing data from similar analyses to above performed separately on portions of documents, paragraphs, document and section titles, and any other available metadata.

According to another embodiment of the present invention, there is provided a computer program product expanding the corpus of a question answering, QA, system, the computer program product comprising a computer readable storage medium having program instructions embodied therewith, the program instructions executable by a processing unit to cause the processing unit to perform a method comprising: identifying a portion of the corpus to be expanded; generating one or more search queries based on at least one of: the semantics or linguistic features of the identified portion of the corpus; and a semantic resource; generating a candidate answer to the one or more queries using the QA system; determining a rating for the candidate answer using one or more scoring algorithms; and integrating the candidate answer with the portion of the corpus if the determined rating for the candidate answer meets or exceeds a predetermined requirement. Embodiments may therefore provide for automated generation and/or expansion of a corpus of a QA system.

According to another embodiment of the present invention, there is provided a question answering, QA, system adapted to expand its corpus, the system comprising: an identification unit adapted to identify a portion of the corpus to be expanded; a query generator adapted to generate one or more queries based on at least one of: the semantics or linguistic features of the identified portion of the corpus; and a semantic resource; an answer generator adapted to generate a candidate answer to the one or more queries; and a processing unit adapted to determine a rating for the candidate answer using one or more scoring algorithms, and wherein the QA system is further adapted to integrate the candidate answer with the portion of the corpus if the determined rating for the candidate answer meets or exceeds a predetermined requirement.

Thus, there may be proposed a QA system which can expand its capabilities for answering queries/questions. The QA system may use its own resources to evaluate and incorporate new related content into its underlying corpus of documents or information. For example, the QA system may generate a candidate answer and then incorporate the candidate answer into its corpus if the answer meets or exceeds a predetermined quality scoring requirement. A proposed embodiment of a QA system may therefore expanded its corpus in an efficient manner so as to avoid unnecessary resource usage for example.

In an embodiment, the identification unit may be adapted to: determine a representation quality of a portion of the corpus; and identify the portion of the corpus as a portion of the corpus to be expanded if the determined representation quality of the portion does not meet a predetermined quality requirement. For example, low-detail portions of a DSC of a QA system may be identified. Such low-detail portions may be selected for expansion if an assessment of their representation quality does not meet a predetermined standard. In this way, unnecessary expansion of high-detail portions of a corpus may be avoided.

Also, in an embodiment, the identification unit may comprise a representation quality determination unit adapted to: identify the low frequency occurrence of semantic concepts or relationship patterns in the portion of the corpus; use a statistical language model to determine if one or more concepts of the portion of the corpus are defined with a predetermined level of clarity; or identify the presence of answers to predetermined problematic questions within the portion of corpus. Embodiments may therefore employ various techniques for accurately identifying portions of the corpus that have poor representation and/or would most benefit from corpus expansion. Unnecessary expansion of the corpus may thus be avoided.

The query generator may be adapted to: generate a natural language query based on a question or an answer to a question associated with the identified portion of the corpus; construct a search or natural language query using linguistic features derived from the corpus or semantic resource; traverse a semantic graph associated with the corpus or semantic resource to construct a natural language query; generate a search or natural language query based on a predetermined problematic question associated with the QA system; or generate a search or natural language query based on a portion of a document provided by the corpus or semantic resource.

Embodiments may therefore construct queries in a natural language form or in a search engine form. In this way, For example, interaction using natural language and/or predefined search constructs can be cater for and accurately represented in order to generate candidate answer that are closely aligned with the intention of a user. Improved accuracy and/or relevance of content may therefore be obtained.

In an embodiment, the answer generator may be adapted: to control the QA system to analyze the one or more queries, to formulate one or more search queries against different knowledge sources, and to identify an retrieve relevant content from the knowledge sources based on the analysis result; and to generate the candidate answer based on the identified relevant content, wherein candidate answers are representative of content from the knowledge sources. Highly relevant material for answering a query may therefore be retrieved for potential inclusion in a corpus. Such material may be of a format which is appropriate for use by a person and/or inclusion in a corpus, e.g. in a machine-readable format, in summary form, or as reference/link.

The processing unit may be adapted to: process the candidate answer in accordance with one or more QA scoring algorithms, the one or more QA scoring algorithms being adapted to determine a rating for the candidate answer based on: the natural language query; the corpus; and a semantic resource; and to rate the similarities and degree of matching between one or more of: search query; the generated candidate answer; one or more previously generated candidate answers; the corpus; and at least one semantic resource. Use of existing QA infrastructure may enable the use of integrated scoring/ranking algorithms, thus reducing a need for additional hardware/software/components to be implemented.

Embodiments may be further adapted to: compare the determined rating for the candidate against a threshold; and based on the result of the comparison, to determine if the rating for the candidate answer meets or exceeds the predetermined requirement. Unnecessary or unwarranted expansion of a corpus may therefore be avoided, thereby reducing system resources and/or complexity.

Some embodiments may be further adapted to generate a semantic resource from at least one domain-specific semantic resource. Embodiments may therefore be employed where an initial/starting corpus does not exist, since they may provide for the generation of a corpus from various semantic-resources. Embodiments may also be further adapted to process data of the domain-specific semantic resource to generate a semantic graph; and to weight the semantic graph based on characteristics of the corpus. This may, for example, enable graph-based techniques to be employed for the implementation of existing off-the-shelf ontologies, which may then be tailored for the specifics of a given enterprise domain of an embodiment for example.

BRIEF DESCRIPTION OF THE DRAWINGS

Preferred embodiments of the present invention will now be described, by way of example only, with reference to the following drawings, in which.

DETAILED DESCRIPTION

Figure 1:
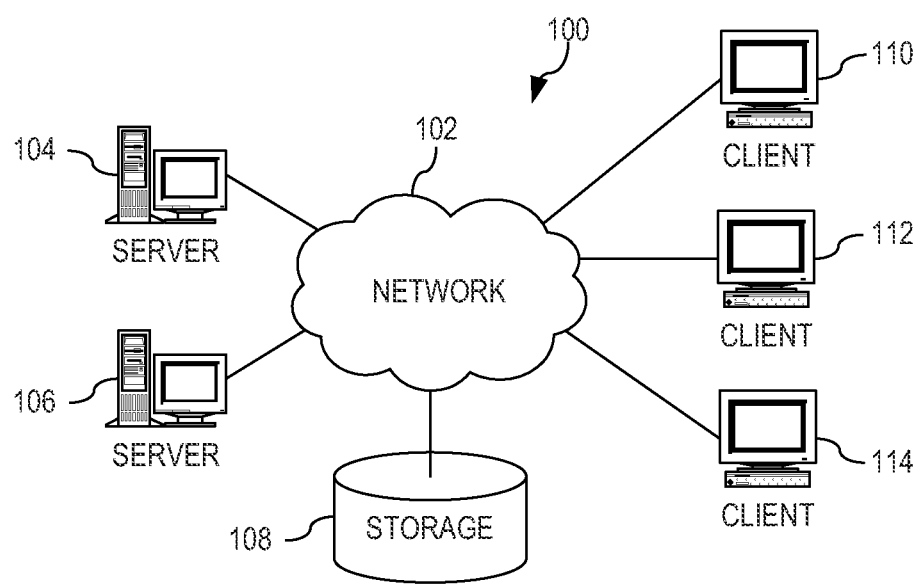
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

Proposed is a concept of expanding the corpus of a QA system. In particular, it is proposed to use a QA system to retrieve, evaluate and accept (e.g. integrate or incorporate) new related content into its underlying corpus of documents or information. Candidate content for potential integration into the corpus may be identified (in an open-domain semantic resource, for example) by the QA system in response to a received query. Such candidate content may then be evaluated (e.g. ranked or scored using one or more evaluation algorithms) and integrated into the corpus of the QA system if it is determined to meet or exceed a predetermined requirement. By expanding the corpus of a QA system with material that has been determined by the QA system to meet predetermined requirements, for example, the corpus may be expanded automatically in an accurate and efficient manner.

Embodiments may therefore enable a user to interact with a domain-specific QA system using natural language and/or terms that may have otherwise been inappropriate for use with a conventional domain-specific QA system having a corpus which has not been expanded in accordance with the concepts/embodiment proposed herein.

Furthermore, embodiments may enable an enterprise QA system to generate a corpus from one or more open-domain semantic resources. For instance, proposed concepts may enable the generation of new DSC from scratch using the presence of one or more DSRs.

In some embodiments, portions of a QA system's underlying corpus that require expansion may be identified. Expansion of the corpus may therefore be targeted (e.g. limited) only to specific portion, thus avoiding unnecessary expansion of high quality portions of the corpus. This may reduce the resource overhead(s) and/or complexity of a QA system.

Illustrative embodiments may therefore provide concepts for expanding a corpus of a domain-specific QA system in order to improving an answering capability for queries that, for example, are not strictly related to the specific domain of the QA system and/or phrased/structured in an inappropriate or unsuitable manner.

Such concepts may provide for the generation and/or expansion of a corpus of a QA system in an automated manner. Any QA system could be used with the proposed concept, but is may be preferable for such QA system to exhibit at least one of the following qualities: Natural Language Processing capabilities; Deep syntax parsing; Semantic analysis of text; Named Entity Recognition; Search-based Candidate Answer Generation; Candidate and Answer Scoring/Ranking Modifications and additional steps to a traditional QA system are also proposed which may enhance the value and utility of the proposed concepts.

With QA systems relying on an underlying corpus (e.g. body or collection) of documents or information, reference to a Domain-Specific Corpus (DSC) may thus be taken to refer to a closed-domain corpus (e.g. enterprise content), generally describing a specific domain or area of expertise. An enterprise QA system (e.g. a QA system for an individual organization) which employs a DSC will therefore typically require expansion of the DSC to cater for QA use-cases.

Similarly, a Domain-related Corpus (DRC) is a typically larger corpus that covers a wider range of topics, but which also has some semantic relationship with, or potential semantic relevance for, a DSC (e.g., Wikipedia™, DBPedia™, Freebase™, etc.). Also included in the definition of a DRC may be any publically available set of closed-domain corpora that are somehow related and available for expansion (e.g. Terms and Conditions documentation, results of web searches, W3C specification, streams of related content, etc.).

A Domain-related Semantic Resource (DSR) is a resource that describes the semantics of the enterprise corpus being expanded. Typically, a semantic graph can be generated from this data. Additionally, a third party resource that is not intended for this purpose may be adapted to do so.

Reference to Linguistic features may be taken to refer to any linguistic features that may be discovered or derived from text, such as named entities or semantic concepts, topic classifications, parse structures, lexical frames, part of speech patterns, inter-concept relationships, etc.

Figure 2:
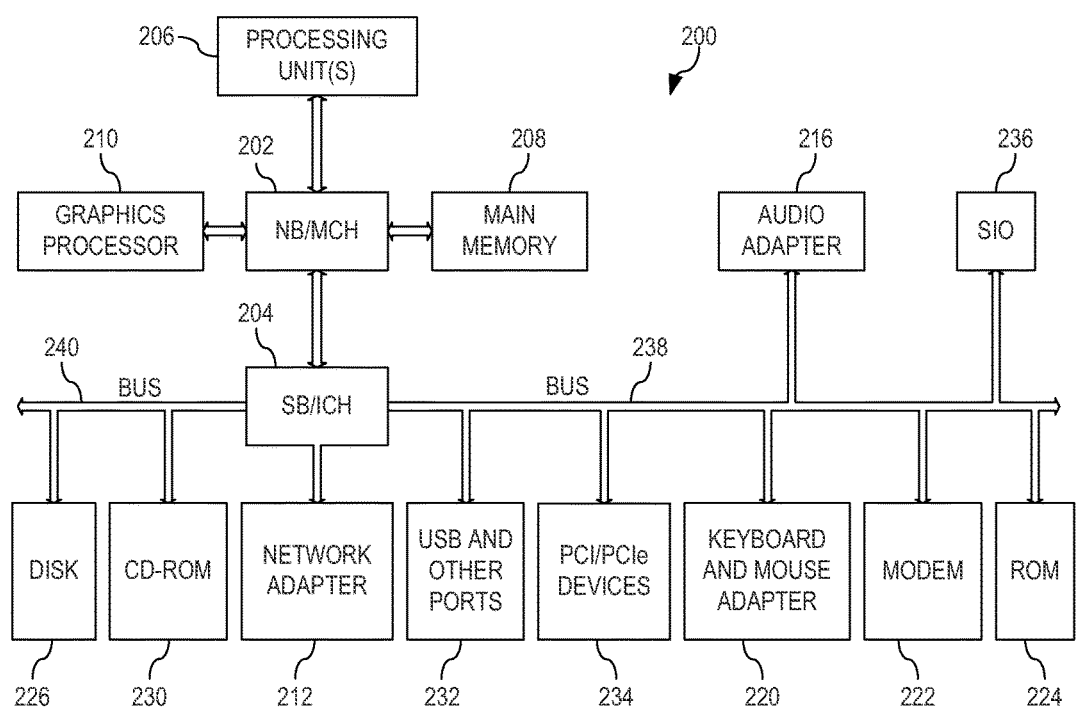
FIG. 2 is a block diagram of an example data processing system in which aspects of the illustrative embodiments may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed prediction system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200. Java and all Java-based trademarks and logos are trademarks or registered trademarks of Oracle and/or its affiliates.

As a server, system 200 may be, for example, an IBM® eServer™ System p computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer and AIX are trademarks of International Business Machines Corporation, registered in many jurisdictions worldwide. Linux is a registered trademark of Linus Torvalds in the United States, other countries, or both.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a domain-specific QA system by providing for expansion of its DSC. Embodiments may enable information from DRCs to be identified by the QA system and then integrated into the DSC if it meets predetermined information quality requirements. Such concepts can extend or improve the answering capabilities of a domain-specific QA system.

Figure 3:
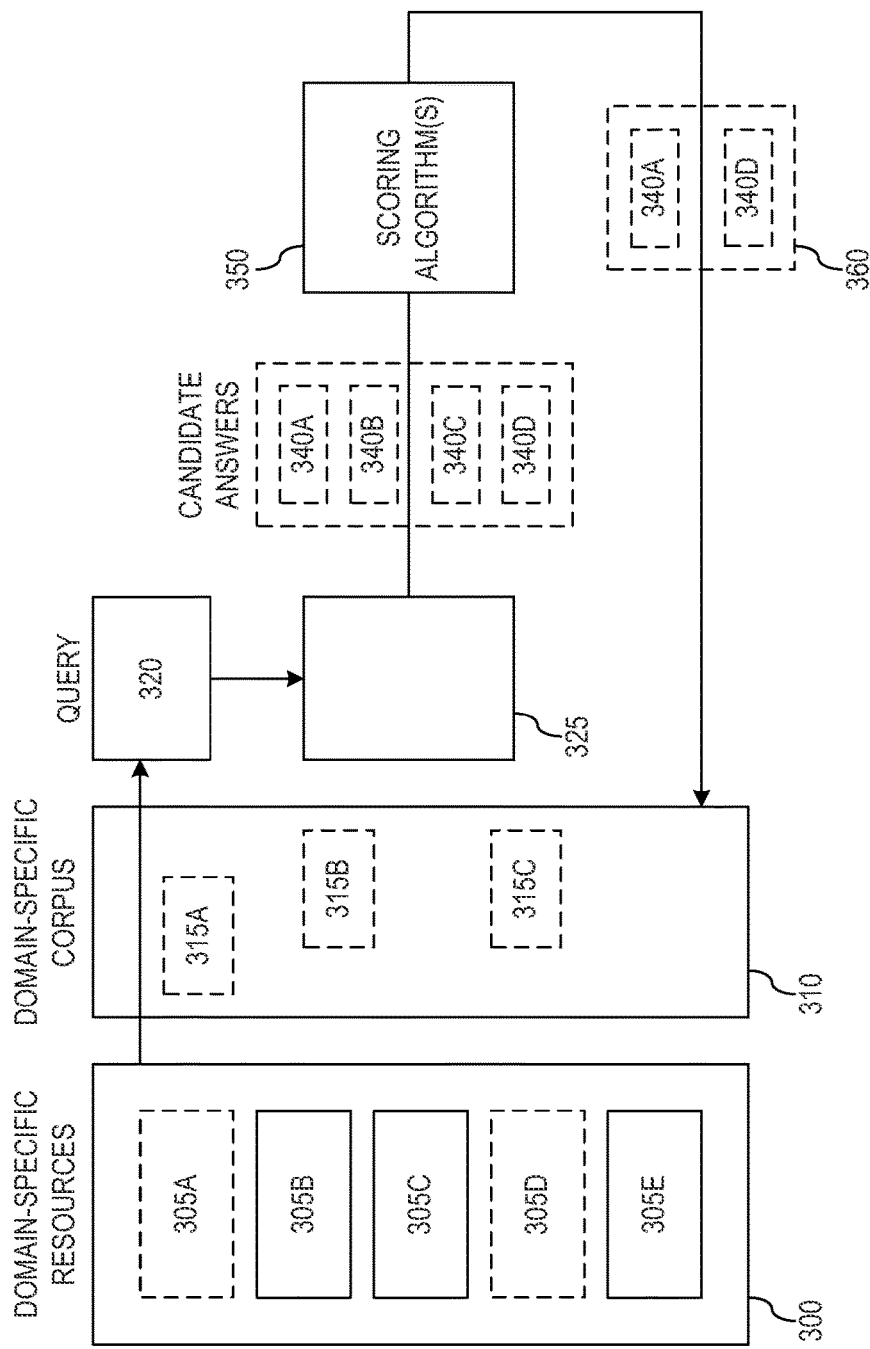
FIG. 3 is a flow diagram illustrating an exemplary implementation of a computer-implemented method according to an embodiment.

Turning now to FIG. 3, an exemplary implementation of a computer-implemented method according to an embodiment will now be described.

The method begins in step 300 suitable DSRs are identified using any available enterprise data. Here, DSRs that best describe the semantics of the enterprise (e.g. domain-specific) corpus being expanded may be selected from a set of first 305A to fifth 305E DSRs. In this example, the second 305B, third 305C and fifth 305E DSRs are selected and this is depicted using solid boundary lines. Thus, the first 305A and fourth 305D DSRs are not selected and this is depicted using dashed boundary lines. It will be appreciated that method step 300 may enable DSRs to be derived from existing resources like question-answer pairs (e.g. ground-truth data), or statistical analysis of parse frames in the DSC. This may facilitate semantically relevant graph-based methods for search and scoring of content.

Next, in step 310, areas of the DSC that do not have sufficient representation are identified. In this example, first 315A to third 315C areas of the DSC are selected and these areas are depicted using dashed boundary lines. Here, step 310 may comprise firstly determining a representation quality of a portion 315A of the DSC, and, secondly, identifying the portion 315A of the DSC as a portion of the DSC to be expanded if the determined representation quality of the portion does not meet a predetermined quality requirement. For example, one or more of the selected DSRs 305B,305C, 305E may be used to identify low-detail portions of the DSC. Low-detail portions may be assumed to benefit from additional content.

By way of example, determining a representation quality of a portion of the DSC may comprise one or more various techniques, including: identifying the low frequency occurrence of semantic concepts or relationship patterns in the portion of the corpus; using a statistical language model to determine if one or more concepts of the portion of the corpus are defined with a predetermined level of clarity; or identifying the presence of answers to predetermined problematic questions within the portion of corpus.

Using the DSRs identified in step 300 and the areas of the DSC identified in step 310, the method generates one or more queries in step 320. Here, by way of example, the step 320 of generating one or more queries may comprise generating one or more search or natural language queries. Generation of such search or natural language queries may comprise one or more various techniques, including: generating a natural language query based on a question or an answer to a question associated with the identified portion(s) of the DSC; using linguistic features derived from the DSC or DSRs to construct a search or natural language query; traversing a semantic graph associated with the DSC or DSRs to construct a search or natural language query; generating a search or natural language query based on a predetermined problematic question associated with the QA system; or generating a search or natural language query based on a portion of a document provided by the DSC or DSRs. Accordingly, the exemplary method may enable the construction of queries a natural language form or a search engine form. By way of further example, queries may be generated from linguistic features discovered or derived from the DSC or a DSR, such as named entities or semantic concepts, topic classifications, parse structures, lexical frames, part of speech patterns, and inter-concept relationships for example.

Next, in step 325, a set of candidate answers 340A-340D (e.g. potential new content) to the query is generated from the DRC. Here, by way of example, the step 325 of generating candidate answers to the query may comprise: controlling the QA system to analyze the query, to formulate one or more search queries against different knowledge sources, and to identify and retrieve relevant content from the knowledge sources based on the analysis result. One or more candidate answers may then be generated based on the identified relevant content. The generated candidate answers 340A-340D may be representative of content from the knowledge sources. For example, candidate answers may be in the form of document sections, paragraphs, passages or entire document content. The generated candidate answers 340A-340D may therefore provide appropriate or relevant material for answering the query, and the material may be provided in a form which is appropriate for use by a person and/or inclusion in the corpus of the QA system.

The generated candidate answers 340A-340D are then scored/rated and ranked output in step 350. Here, the step of determining a score/rating for each candidate answer 340A-340D may comprise scoring the candidate answer in accordance with one or more QA scoring algorithms. For example, a QA scoring algorithm may be adapted to determine a rating for a candidate answer based on: the query; the corpus; and a semantic resource. A rating or ranking may be based on the similarities and degree of matching between one or more of: the search query; the generated candidate answer; one or more previously generated candidate answers; the corpus; and at least one domain-specific semantic resource.

Finally, in step 360 the candidate answers are selected based on their scoring/ranking and integrated with an appropriate portion of the corpus for expansion. This may comprise, for example, comparing the determined rating for a candidate answer against a threshold, wherein the threshold is representative of an acceptable information quality. Based on the result of the comparison, it may be determined if the rating for the candidate answer meets or exceeds the predetermined requirement. For example, QA outputs may be ranked by default, and the top N candidates (e.g. 340A and 340D) may be automatically integrated into the corpus, or provided for manual evaluation, wherein N may be determined according to a threshold that is representative of an acceptable information quality.

By way of illustration, exemplary method steps of corpus expansion in accordance with an embodiment will now be described as follows:

Step 1: Generate semantic resources from available enterprise data, preferably in the form of a semantic graph, which can further be weighted according to characteristics of DSC. For example, such semantic resources may be derived from the following: (i) question-answer pairs, from ground-truth or answer-key, describing domain terminology and natural language equivalence, or word embeddings; (ii) other ground truth data such as training data for topic or answer classification, also for domain terminology and natural language equivalence, or word embeddings; (iii) statistical analysis of logical triples or parse frames from the DSC (e.g. using prismatic from DEEPQA); (iv) semantic concept and relationship patterns, concept density, concept frequency, etc.; (v) existing off-the-shelf ontologies from general super-domains, such as UMLS for medical or FIBO for financial domains; (vi) similar analyses to above performed separately on portions of documents, paragraphs, document and section titles, and any other available metadata; and (vii) combinations of the above in a weighted semantic graph.

Step 2: Identify portions of the corpus that have poor representation (e.g. portions which may benefit from corpus expansion). For example, such portions may be identified based on the following: (i) low-frequency patterns of concepts/relationships/frames, etc. only occurring in 1 or small number of documents; (ii) concepts that are not well defined in the corpus (e.g. for a set of known well-defined concepts, one may build a statistical language model describing these contexts using patterns of linguistic features previously identified, and this model may then be used to identify further concepts in the corpus with poor representation from a background information/definition perspective; (iii) any existing data from enterprise system on specific problematic questions or scenarios that are not well handled by the QA system (in combination with analysis of associated linguistic feature patterns and graph data; and (iv) existing poor quality (or best current match) answers to known problematic questions.

Step 3: From the poorly represented portions of the corpus identified in Step 2, construct semantically relevant natural language queries that reflect the content. For example, questions from an existing ground truth will be in the form of natural language queries. Those queries associated with poorly represented topics or concepts can be used directly here. Alternatively, and/or additionally, parse frames, semantic concept and relationship patterns, from previous steps, can also be used to automatically construct new natural language queries. Similarly, a derived semantic graph can be used to construct new sentences with semantically related concepts, using known graph-traversal heuristics for natural language composition. Further, additional known problematic natural language queries from the enterprise can also be used here. It is also noted that entire documents, or portions thereof, that constitute poorly represented content, may be considered as natural language queries in this context.

Step 4: The QA system proceeds to analyze the query as normal and produces a set of candidate answers from searching the DRC. Here, candidates may be in the form of document sections, paragraphs, passages or entire document content for example.

Step 5: The search results, or corpus expansion candidates, are scored against the input query, using QA scoring and ranking mechanisms. The QA scoring mechanism can also leverage any available DSRs for matching between Query and Answer, in addition to data gathered at Step 1. Filtering of semantically distant candidates may also be implemented as a precursor to normal scoring, using the same analysis data gathered in Step 1. This may accelerate processing and enable focus to be placed on best candidates only.

Step 6: A set of candidate answers may now be used to expand the DSC, for example. For instance, this may comprise candidates over a specified confidence threshold, the top ranked N candidates, or a set of candidates identified by a manual review.

A practical example of an embodiment being used in business may comprise a set of documentation for a financial institution, e.g. a bank, containing a majority of the financial terms that could be used within the immediate domain of the bank's products and services. Such documentation may not contain a reference for just any related financial term, such as technical terms in the domain of insurance for example. Thus, even if the bank does not currently offer insurance products, or has no documentation describing its relationship with third-party insurance companies, this does not preclude a lack of questions on such topics from an end user. Rather than attempting to answer the question badly, with completely unrelated material, it would be beneficial if the background corpus, used for candidate answer generation, were automatically made more robust (e.g. expanded) to cope with this and other similar scenarios. An existing general financial terminology like the Financial Industry Business Ontology (FIBO) may be leveraged in order to expand an existing enterprise corpus with documents that are in some way related to the field of Banking, but which cover other related topics, that could feasibly be the subject of future user queries. Also, documents from open domain sources, such as Wikipedia™, DBPedia™, etc. could be selected that improve the coverage of the enterprise corpus. This may enhance the bank's corpus, and reduce a number of unsupported or unexpected questions. Thus, embodiment may enable the answering of questions not originally envisaged by the Bank's internal documentation, and this may be done with a high degree of accuracy and/or without the intervention of a human operator.

By way of further illustration, embodiments may enable corpus generation, which may be considered to be a special case where the DSC is empty to begin with. Thus, although the proposed concepts for corpus expansion may be implemented, the process may be described as corpus generation or corpus building. By allowing this process to be done automatically, embodiment may facilitate the initial development (from scratch) of a QA use-case for any enterprise use-case. This may help to overcome a significant challenge in bringing QA systems to market, where having a good quality DSC is seen as an important base requirement.

For example, a practical example of such an embodiment may involve an online retailer of mechanical parts. A semantic resource, such as an ontology describing existing products and relationships between them (e.g. dependencies between parts, or materials used), may be used to generate natural language queries over DRC, from which related content may be extracted to build a QA system for general user queries on the available products and their properties. With no original DSC of data, the retailer may now implement QA system to answer customer queries dynamically, rather than relying on a static and limited FAQ section.

Figure 4:
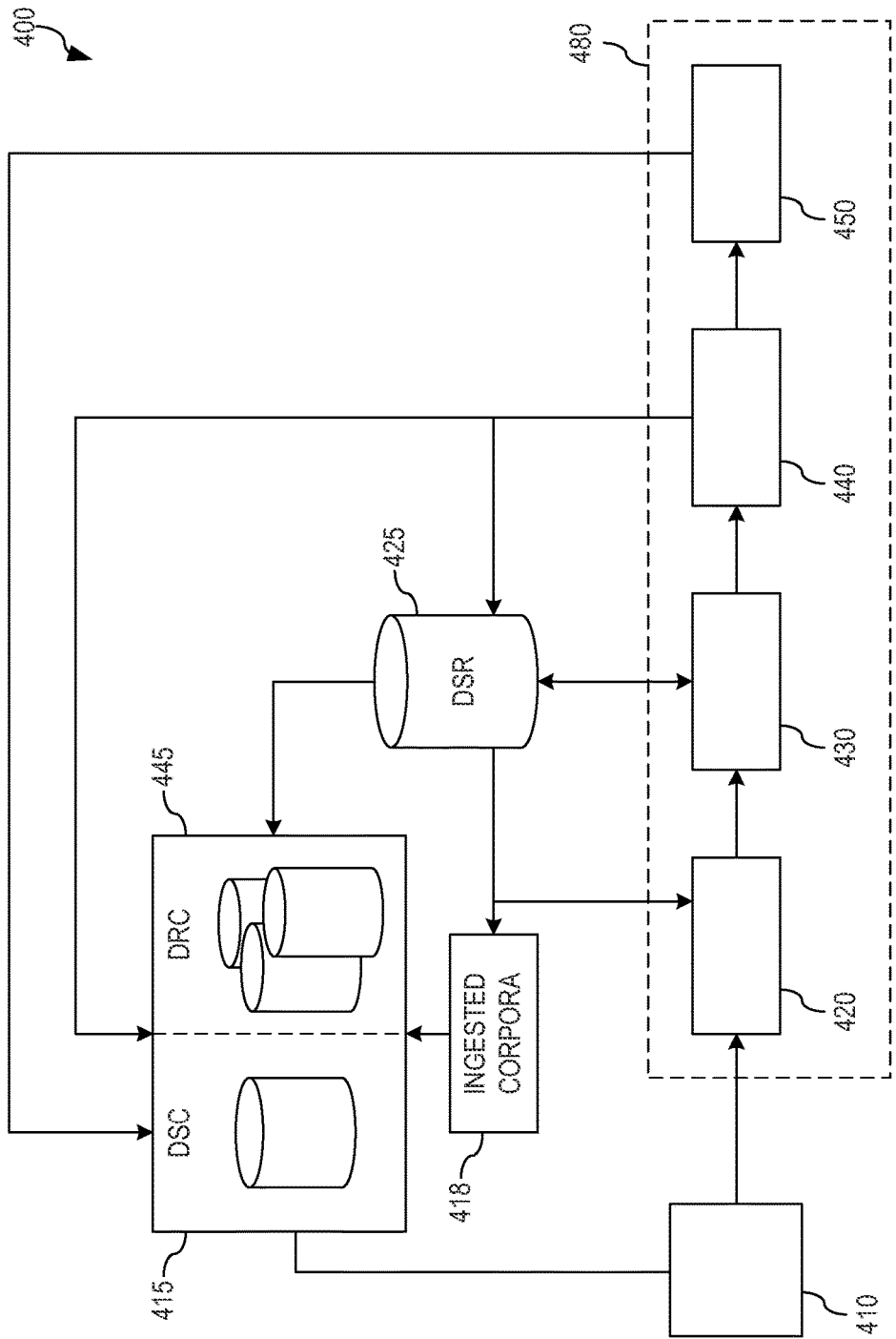
FIG. 4 is a schematic block diagram of a question answering system according to an embodiment.

With reference to FIG. 4, a QA system 400 according to an embodiment comprises: an identification unit 410 adapted to identify a portion of a DSC 415 to be expanded; and a query generator 420 adapted to generate one or more queries based on the semantics or linguistic features of the identified portion of the DSC 415 and a DSR 425. The system 400 also comprises: an answer generator 430 adapted to generate a candidate answer to the one or more queries; and a processing unit 440 adapted to determine a rating for the candidate answer using one or more scoring algorithms. The QA system 400 is adapted to integrate the candidate answer with the portion of the DSC 415 if the determined rating for the candidate answer meets or exceeds a predetermined requirement. For this purpose, the QA system comprises a corpus modification unit 450 which is adapted to assess whether or not the determined rating for a candidate answer meets or exceeds a predetermined requirement (e.g. a threshold value), and to add the candidate answer to the DSC 415 based on the outcome of the assessment.

For provision of the system corpus, one or more suitable DSRs 425 may be identified (using any available enterprise data) and included as ingested corpora 418 within the DSC 415 and/or DRC 445.

In this example, the identification unit 410 is adapted to determine a representation quality of a portion of the DSC 415 and to identify the portion of the DSC as a portion to be expanded if the determined representation quality of the portion does not meet a predetermined quality requirement. Put another way, the identification unit 410 is adapted to identify low-detail/quality portions of the DSC 415. For this purpose, the identification unit 415 may, for instance, comprise a representation quality determination unit (not shown) which is adapted to: identify the low frequency occurrence of semantic concepts or relationship patterns in the portion of the DSC 415; use a statistical language model to determine if one or more concepts of the portion of the DSC 415 are defined with a predetermined level of clarity; or identify the presence of answers to predetermined problematic questions within the portion of DSC 415. The identification unit 415 may therefore employ various techniques for accurately identifying portions of the DSC 415 that have poor representation and/or would most benefit from corpus expansion.

The identification unit 415 provides information about an identified portion for expansion to the query generator 420. The query generator 420 may be adapted to generate a natural language query. By way of example, the query generator 420 may generate a natural language query based on a question or an answer to a question associated with the identified portion of the corpus. Additionally, and/or alternatively, the query generator 420 may be adapted to construct a search or natural language query using linguistic features derived from the DSC 415 or DSR 425. The query generator 420 may therefore be adapted to construct queries in a natural language form or in a search engine form.

The query generator 420 provides information about a generated query to the answer generator 430. The answer generator 420 may be adapted to generate a candidate answer to the query. For example, the answer generator may control the QA system 400 to analyze the query, to formulate one or more search queries against different knowledge sources (.g. the DSC 415, the DRC 445, and the DSR 425) to identify and retrieve relevant content from the knowledge sources based on the analysis result. Based on the identified relevant content, the answer generator may generate a candidate answer. Here, a candidate answer may be adapted to be representative of content from the knowledge sources, and such material may be of a format which is appropriate for use by a person and/or inclusion in a corpus, e.g. in a machine-readable format, in summary form, or as reference/link. The answer generator 420 may therefore be understood to be adapted to identify relevant material for answering a received query, and this identified material may have for potential inclusion in the DSC 415.

The answer generator 430 provides information about a candidate answer to the processing unit 440. In this example, the processing unit 440 is adapted to process the candidate answer in accordance with QA scoring algorithms. The QA scoring algorithms may, for example, be adapted to determine a rating for the candidate answer based on: the natural language query; the corpus; and a semantic resource. The processing unit 440 is then adapted to rate the similarities and degree of matching between one or more of: the query; the generated candidate answer; one or more previously generated candidate answers; the corpus; and at least one semantic resource. In this way, the processing unit 440 may be adapted to use of existing QA system 400 infrastructures.

The processing unit 440 provides information about the determined rating(s) for candidate answer to the corpus modification unit 450. Here, the corpus modification unit 450 is adapted to assess whether or not the determined rating for a candidate answer meets or exceeds a predetermined requirement (e.g. a threshold value). Based on the result of the assessment, the corpus modification unit 450 may add (e.g. integrate, include or incorporate) the candidate answer to the DSC 415.

It will appreciated the describe combination of the answer generator 420, answer generator 430, the processing unit 440, and the corpus modification unit 450.

Figure 5:
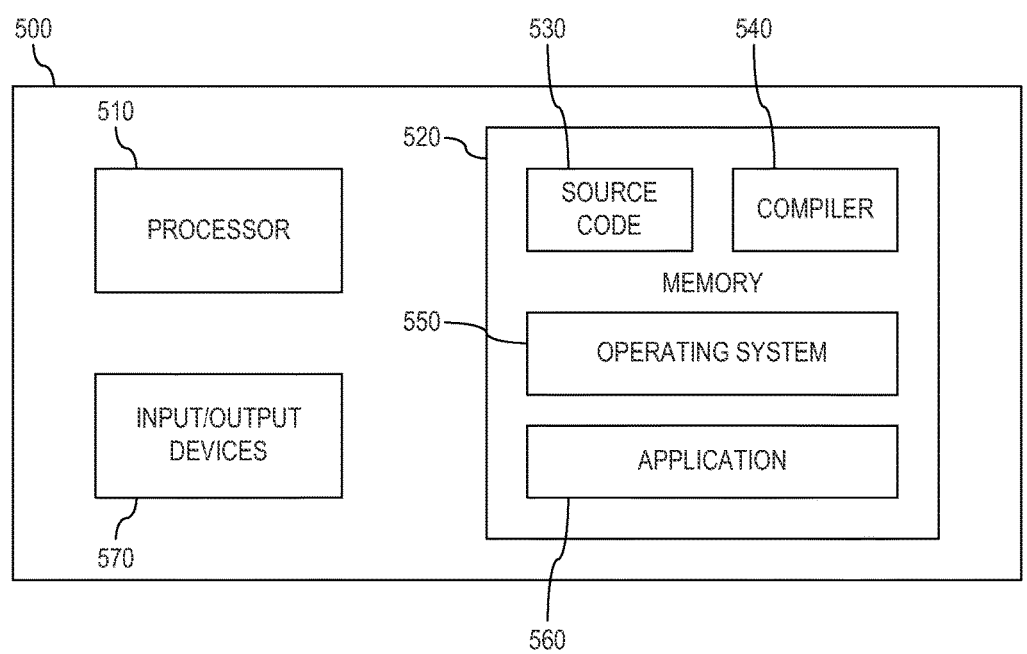
FIG. 5 illustrates an example of a computer within which one or more parts of an embodiment may be employed.

FIG. 5 illustrates an example of a computer 500 within which one or more parts of an embodiment may be employed. Various operations discussed above may utilize the capabilities of the computer 500. For example, one or more parts of a system for converting synchronous operations into asynchronous operations may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a microprocessor.

The memory 520 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method of expanding an existing domain specific corpus of a question answering (QA) system comprising:
    identifying, by an identification unit within the QA system, a portion of the existing domain specific corpus to be expanded, wherein identifying the portion of the existing domain specific corpus to be expanded comprises;
        determining, by the identification unit, a representation quality of a selected portion of the existing domain specific corpus by identifying a presence of answers to predetermined problematic questions within the portion of the existing domain specific corpus; and
        identifying, by the identification unit, the selected portion of the existing domain specific corpus as the portion of the existing domain specific corpus to be expanded responsive to the determined representation quality of the portion failing to meet a predetermined quality requirement;
    generating, by a query generator within the QA system, one or more search queries based on semantics or linguistic features of the identified portion of the existing domain specific corpus and a set of domain-related semantics resources, wherein generating the one or more search queries comprises generating one or more search or natural language queries and wherein generating the one or more search or natural language queries comprises traversing a semantic graph associated with the existing domain specific corpus or the set of domain-related semantic resources to construct a search or natural language query;
    generating, by an answer generator within the QA system, a candidate answer to the one or more search queries using the QA system;

determining, by a processing unit within the QA system, a rating for the candidate answer using one or more scoring algorithms; and integrating, by a corpus modification unit within the QA system, the candidate answer with the portion of the existing domain specific corpus responsive to the determined rating for the candidate answer meeting or exceeding a predetermined requirement.

2. The computer-implemented method of claim 1, wherein determining the representation quality of the selected portion of the existing domain specific corpus further comprises at least one of:

identifying, by the identification unit, a low frequency occurrence of semantic concepts or relationship patterns in the portion of the existing domain specific corpus based on comparing the semantic concepts or the relationship patterns in the portion of the existing domain specific corpus to semantic concepts or relationship patterns in the set of domain-related semantic resources; or using, by the identification unit, a statistical language model to determine whether one or more concepts of the portion of the existing domain specific corpus are defined within a predetermined level of clarity.

3. The computer-implemented method of claim 1, wherein generating the one or more search or natural language queries further comprises at least one of:

generating, by the query generator, the natural language query based on a question or an answer to a question associated with the identified portion of the existing domain specific corpus;

using, by the query generator, linguistic features derived from the existing domain specific corpus or the set of domain-related semantic resources to construct the search or the natural language query;

generating, by the query generator, the search or the natural language query based on a predetermined problematic question associated with the QA system; or generating, by the query generator, the search or the natural language query based on a portion of a document provided by the existing domain specific corpus or the set of domain-related semantic resources.

4. The computer-implemented method of claim 1, wherein generating the candidate answer to the one or more search queries comprises:

controlling, by the answer generator, the QA system to analyze the one or more search queries, to formulate one or more search queries against different knowledge sources, and to identify and retrieve relevant content from the knowledge sources based on the analysis result; and generating, by the answer generator, the candidate answer based on the identified relevant content, wherein the candidate answer is representative of content from the knowledge sources.

5. The computer-implemented method of claim 1, wherein determining the rating for the candidate answer comprises:

scoring, by the processing unit, the candidate answer in accordance with one or more QA scoring algorithms, the one or more QA scoring algorithms being adapted to determine the rating for the candidate answer against based on: the one or more search queries; the existing domain specific corpus; and the set of domain-related semantic resources; and rating, by the processing unit, similarities and a degree of matching between one or more of: the one or more search queries; the generated candidate answer; one or more previously generated candidate answers; the existing domain specific corpus; and at least one of the set of domain-related semantic resources.

6. The computer-implemented method of claim 1, wherein integrating the candidate answer with the portion of the existing domain specific corpus comprises:

comparing, by the corpus modification unit, the determined rating for the candidate answer against a threshold; and based on the result of the comparison, determining, by the corpus modification unit, whether the rating for the candidate answer meets or exceeds the predetermined requirement.

7. A computer program product for expanding an existing domain specific corpus of a question answering (QA) system, the computer program product comprising a non-transitory computer readable storage medium having program instructions embodied therewith, the program instructions executable by a processing unit to cause the processing unit to perform a method comprising:

identifying, by an identification unit within the QA system, a portion of the existing domain specific corpus to be expanded, wherein identifying the portion of the existing domain specific corpus to be expanded comprises:

determining, by the identification unit, a representation quality of a selected portion of the existing domain specific corpus by identifying a presence of answers to predetermined problematic questions within the portion of the existing domain specific corpus; and identifying, by the identification unit, the selected portion of the existing domain specific corpus as the portion of the existing domain specific corpus to be expanded responsive to the determined representation quality of the portion failing to meet a predetermined quality requirement;

generating, by a query generator within the QA system, one or more search queries based on semantics or linguistic features of the identified portion of the existing domain specific corpus and a set of domain-related semantic resources, wherein generating the one or more search queries comprises generating one or more search or natural language queries and wherein generating the one or more search or natural language queries comprises traversing a semantic graph associated with the existing domain specific corpus or the set of domain-related semantic resources to construct a search or natural language query;

generating, by an answer generator within the QA system, a candidate answer to the one or more search queries using the QA system;

determining, by a processing unit within the QA system, a rating for the candidate answer using one or more scoring algorithms; and integrating, by a processing unit within the QA system, the candidate answer with the portion of the existing domain specific corpus responsive to the determined rating for the candidate answer meeting or exceeding a predetermined requirement.

8. The computer program product of claim 7, wherein the program instructions to determine the representation quality of the selected portion of the existing domain specific corpus further cause the processing unit to perform the method comprising at least one of:

identifying, by the identification unit, a low frequency occurrence of semantic concepts or relationship patterns in the portion of the existing domain specific corpus based on comparing, the semantic concepts or the relationship patterns in the portion of the existing domain specific corpus to semantic concepts or relationship patterns in the set of domain-related semantic resources; or using, by the identification unit, a statistical language model to determine whether one or more concepts of the portion of the existing domain specific corpus are defined within a predetermined level of clarity.

9. The computer program product of claim 7, wherein the program instructions to generate the one or more search or natural language queries further cause the processing unit to perform the method comprising at least one of:

generating, by the query generator, the natural language query based on a question or an answer to a question associated with the identified portion of the existing domain specific corpus;

using, by the query generator, linguistic features derived from the existing domain specific corpus or the set of domain-related semantic resources to construct the search or the natural language query;

generating, by the query generator, the search or the natural language query based on a predetermined problematic question associated with the QA system; or generating, by the query generator, the search or the natural language query based on a portion of a document provided by the existing domain specific corpus or the set of domain-related semantic resources.

10. The computer program product of claim 7, wherein the program instructions to generate the candidate answer to the one or more search queries further cause the processing unit to perform the method comprising:

controlling, by the answer generator, the QA system to analyze the one or more search queries, to formulate one or more search queries against different knowledge sources, and to identify and retrieve relevant content from the knowledge sources based on the analysis result; and generating, by the answer generator, the candidate answer based on the identified relevant content, wherein the candidate answer is representative of content from the knowledge sources.

11. The computer program product of claim 7, wherein the program instructions to determine the rating for the candidate answer further cause the processing unit to perform the method comprising:

scoring, by the processing unit, the candidate answer in accordance with one or more QA scoring algorithms, the one or more QA scoring algorithms being adapted to determine the rating for the candidate answer against based on: the one or more search queries; the existing domain specific corpus; and the set of domain-related semantic resources; and rating, by the processing unit, similarities and a degree of matching between one or more of: the one or more search queries; the generated candidate answer; one or more previously generated candidate answers; the existing domain specific corpus: and at least one of the set of domain-related semantic resources.

12. The computer program product of claim 7, wherein the program instructions to integrate the candidate answer with the portion of the existing domain specific corpus further cause the processing unit to perform the method comprising:

comparing, by the corpus modification unit, the determined rating for the candidate answer against a threshold; and based on the result of the comparison, determining, by the corpus modification unit, whether the rating for the candidate answer meets or exceeds the predetermined requirement.

13. A question answering (QA) system adapted to expand its existing domain specific corpus, the QA system comprising:

an identification unit adapted to identify a portion of the existing domain specific corpus to be expanded, wherein the identification unit identifies the portion of the existing domain specific corpus to be expanded by:

determining a representation quality of a selected portion of the existing domain specific corpus by identifying a presence of answers to predetermined problematic questions within the portion of the existing domain specific corpus; and identifying the selected portion of the existing domain specific corpus as the portion of the existing domain specific corpus to be expanded responsive to the determined representation quality of the portion failing to meet a predetermined quality requirement;

a query generator adapted to generate one or more queries based on semantics or linguistic features of the identified portion of the existing domain specific corpus and a set of domain-related semantic resources, wherein generating the one or more search queries comprises generating one or more search or natural language queries and wherein generating the one or more search or natural language queries comprises traversing a semantic graph associated with the existing domain specific corpus or the set of domain-related semantic resources to construct a search or natural language query;

an answer generator adapted to generate a candidate answer to the one or more search queries;

a processing unit adapted to determine a rating for e candidate answer using one or more scoring algorithms; and a corpus modification unit adapted to integrate the candidate answer with the portion of the existing domain specific corpus responsive to the determined rating for the candidate answer meeting or exceeding a predetermined requirement.

14. The QA system of claim 13, wherein the identification unit comprises a representation quality determination unit adapted to:

identify a low frequency occurrence of semantic concepts or relationship patterns in the portion of the existing domain specific corpus based on comparing the semantic concepts or the relationship patterns in the portion of the existing domain specific corpus to semantic concepts or relationship patterns in the set of domain-related semantic resources; or use a statistical language model to determine whether one or more concepts of the portion of the existing domain specific corpus are defined within a predetermined level of clarity.

15. The QA system of claim 13, wherein the query generator is adapted to:

generate the natural language query based on a question or an answer to a question associated with the identified portion of the existing domain specific corpus;

construct the search or the natural language query using linguistic features derived from the existing domain specific corpus or the set of domain-related semantic resources;

generate the search or the natural language query based on a predetermined problematic question associated with the QA system; or generate the search or the natural language query based on a portion of a document provided by the existing domain specific corpus or the set of domain-related semantic resources.

16. The QA system of claim 13, wherein the answer generator is adapted to:

control the QA system to analyze the one or more queries, to formulate one or more search queries against different knowledge sources, and to identify an retrieve relevant content from the knowledge sources based on the analysis result; and generate the candidate answer based on the identified relevant content, wherein the candidate answer is representative of content from the knowledge sources.

17. The QA system of claim 13, wherein the processing unit is adapted to:

process the candidate answer in accordance with one or more QA scoring algorithms, the one or more QA scoring algorithms being adapted to determine the rating for the candidate answer against based on: the one or more search queries; the existing domain specific corpus; and the set of domain-related semantic resources; and rate similarities and a degree of matching between one or more of: the one or more search queries; the generated candidate answer; one or more previously generated candidate answers; the existing domain specific corpus; and at least one of set of domain-related semantic resources.

18. The QA system of claim 13, wherein the corpus modification unit is adapted to:

compare the determined rating for the candidate against a threshold; and based on the result of the comparison, to determine whether the rating for the candidate answer meets or exceeds the predetermined requirement.

* * * * *